United States Patent [19]

Suzuki et al.

[11] Patent Number: 5,301,289
[45] Date of Patent: Apr. 5, 1994

[54] CACHE DEVICE FOR SUPPLYING A FIXED WORD LENGTH OF A VARIABLE INSTRUCTION CODE AND INSTRUCTION FETCH DEVICE

[75] Inventors: Masato Suzuki, Ikeda; Masashi Deguchi, Nara; Takashi Sakao, Ibaraki; Toshimichi Matsuzaki, Minoo, all of Japan

[73] Assignee: Matsushita Electric Industrial Co., Ltd., Osaka, Japan

[21] Appl. No.: 80,048

[22] Filed: Jun. 21, 1993

Related U.S. Application Data

[63] Continuation of Ser. No. 443,390, Nov. 30, 1989, abandoned.

[30] Foreign Application Priority Data

Dec. 5, 1988 [JP] Japan .................. 63-307362

[51] Int. Cl.[5] ............................................ G06F 12/00
[52] U.S. Cl. ................................. 395/400; 364/261.3; 364/260; 364/938; 364/948.3; 364/DIG. 1; 395/375
[58] Field of Search .................. 364/200, 900; 395/424

[56] References Cited

U.S. PATENT DOCUMENTS

| 4,764,861 | 8/1988 | Shibuya .................. 364/200 |
| 4,847,753 | 7/1989 | Matsuo et al. .......... 364/200 |
| 4,853,840 | 8/1989 | Shibuya .................. 364/200 |
| 4,894,770 | 1/1990 | Ward et al. .............. 364/200 |
| 4,894,772 | 1/1990 | Langendorf ............. 364/200 |
| 4,943,908 | 7/1990 | Emma et al. ............ 364/200 |
| 4,984,154 | 1/1991 | Hanatani et al. ........ 364/200 |

FOREIGN PATENT DOCUMENTS 0179245 4/1986 European Pat. Off. .

OTHER PUBLICATIONS

D. Meltzer, "Cache Addressing to Minimize Of-f-Boundary Breakage," IBM Tech. Disclosure Bulletin, vol. 27, No. 8, pp. 4781–4784, Jan. 1985.

K. G. Tan, "Cache Organization with Various Line Sizes" IBM Tech. Disclosure Bulletin, vol. 25, No. 3A, pp. 1282–1284, Aug. 1982.

"Next-Sequential Prefetching Using a Branch History Table," IBM Tech. Disclosure Bulletin, vol. 29, No. 10, pp. 4502–4503, Mar. 1987.

Primary Examiner—Joseph L. Dixon
Assistant Examiner—Behzad James Peikari
Attorney, Agent, or Firm—Stevens, Davis, Miller & Mosher

[57] ABSTRACT

An instruction fetching device includes one or both of a cache device and a branch history table. The cache device stores a plurality of pairs, each pair including an instruction string divided into minimum unit instructions and an address of the instruction string. At the time of reading an instruction, an instruction string is selected and output by every minimum unit instruction from at least two pairs. The branch history table stores a plurality of pairs, each pair including a branch destination address and a set of an address of a branch instruction and a value obtained by subtracting a given value from the address. At the time of reading an instruction, first, a pair having an address of a branch instruction which address is the nearest to a head address of an instruction string to be read out is selected from a plurality of pairs, each pair including an address of a branch instruction which address is in a predetermined address range including the instruction string to be read out, or each pair of the plurality of pairs including a value obtained by subtracting a given value from the address of the branch instruction. Then, a branch destination address is selected and output from the pair which is selected first from the plurality of pairs.

7 Claims, 9 Drawing Sheets

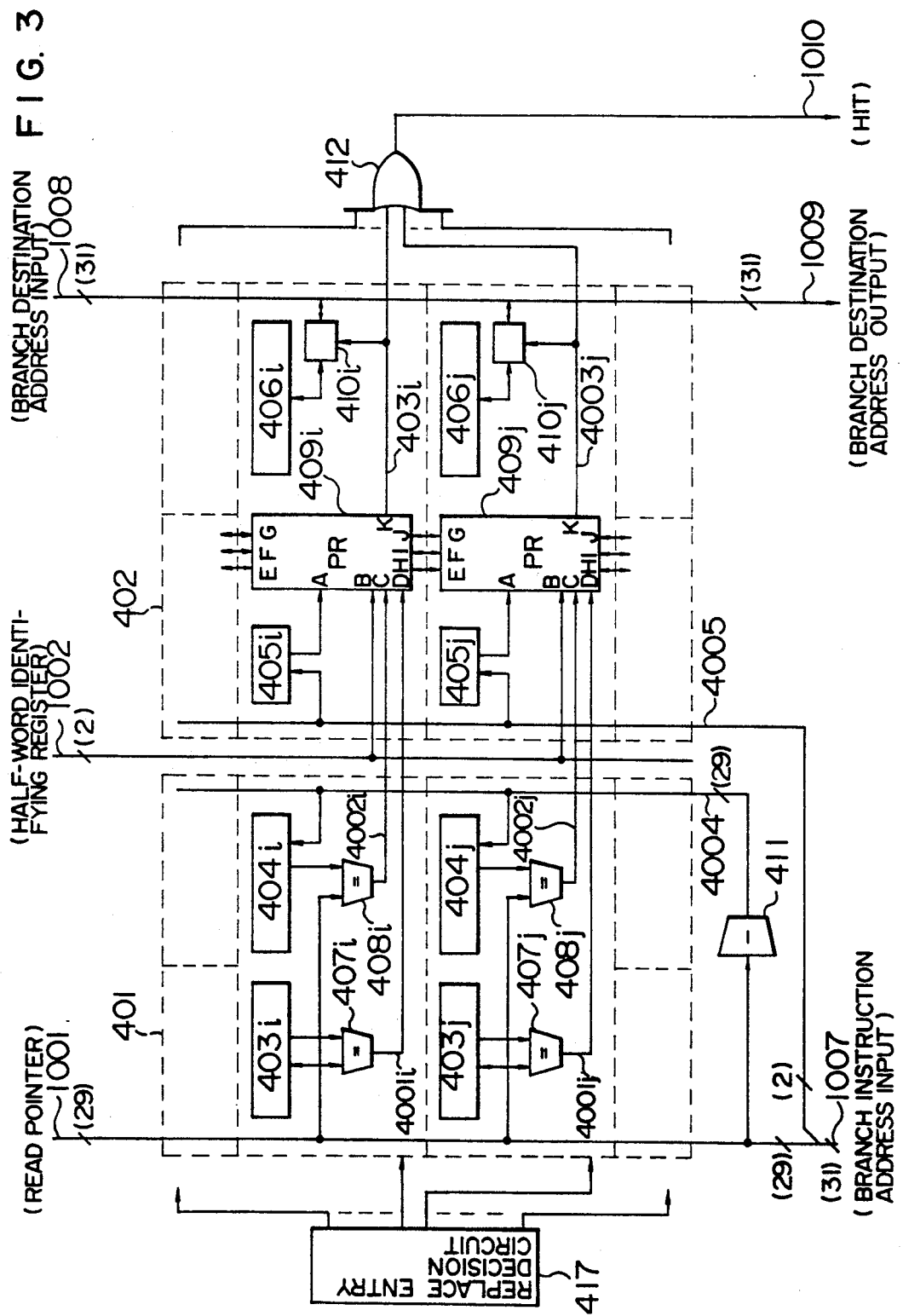

FIG. 4B

| A | | B | | OUT | | CRY |
|---|---|---|---|---|---|---|
| 0 | 0 | 0 | 0 | 0 | 0 | 1 |
| 0 | 0 | 0 | 1 | 1 | 1 | 0 |
| 0 | 0 | 1 | 0 | 1 | 0 | 0 |
| 0 | 0 | 1 | 1 | 0 | 1 | 0 |
| 0 | 1 | 0 | 0 | 0 | 1 | 1 |
| 0 | 1 | 0 | 1 | 0 | 0 | 1 |
| 0 | 1 | 1 | 0 | 1 | 1 | 0 |
| 0 | 1 | 1 | 1 | 1 | 0 | 0 |
| 1 | 0 | 0 | 0 | 1 | 0 | 1 |
| 1 | 0 | 0 | 1 | 0 | 1 | 1 |
| 1 | 0 | 1 | 0 | 0 | 0 | 1 |
| 1 | 0 | 1 | 1 | 1 | 1 | 0 |
| 1 | 1 | 0 | 0 | 1 | 1 | 1 |
| 1 | 1 | 0 | 1 | 1 | 0 | 1 |
| 1 | 1 | 1 | 0 | 0 | 1 | 1 |
| 1 | 1 | 1 | 1 | 0 | 0 | 1 |

FIG. 5A

| | | | | |
|---|---|---|---|---|
| n | OP0 | OP1 | OP2 | OP3 |
| n+8 | OP4 | OP5 | OP6 | OP7 |

FIG. 5B

| OP0 | OP1 | OP2 | OP3 |
|---|---|---|---|

FIG. 5C

| OP4 | OP1 | OP2 | OP3 |
|---|---|---|---|

FIG. 5D

| OP4 | OP5 | OP2 | OP3 |
|---|---|---|---|

FIG. 5E

| OP4 | OP5 | OP6 | OP3 |
|---|---|---|---|

FIG. 6

| | | | | |
|---|---|---|---|---|
| n | | Bcc 0 | | Bcc 1 |
| n+8 | | | Bcc 2 | Bcc 3 |

PRIOR ART
F I G. 9A

| | | | |
|---|---|---|---|
| Bcc 0 | | Bcc 1 | | n

PRIOR ART
F I G. 9B

| | | | | |
|---|---|---|---|---|
| | | | | OP |
| disp 32 | | | | | n n+8

CACHE DEVICE FOR SUPPLYING A FIXED WORD LENGTH OF A VARIABLE INSTRUCTION CODE AND INSTRUCTION FETCH DEVICE

This application is a continuation of application Ser. No. 443,390, filed Nov. 30, 1989, now abandoned.

BACKGROUND OF THE INVENTION

The present invention relates to a central processing unit of a computer and more particularly to an instruction fetch device for predicting a branch destination of a branch instruction by supplying fixed-length part of a variable-length instruction.

FIG. 8 shows the construction of a conventional instruction fetch device for performing a branch destination prediction. In the Figure, numeral 7 designates a 29-bit read pointer for holding the leading address of an instruction code to be read, 8 an instruction cache, and 9 a branch history table for storing as a set the address of each branch instruction taken and the address of the branch destination. The address of an instruction code to be read is stored in the read pointer 7 and the instruction cache 8 and the branch history table 9 are searched. When the instruction code read out from the instruction cache 8 includes any branch instruction taken in the past, it is expected that its branch destination address is also read from the branch history table 9. In this case, this branch destination address is read and stored in the read pointer 7 and the instruction cache 8 is searched thereby reading the instruction code at the branch destination without waiting until the decoding and execution of the branch instruction.

However, where branch instructions Bcc0 and Bcc1 are respectively present at the positions of addresses n and n+4 as shown in the instruction alignment diagram in FIG. 9A, after the high-order 29 bits of the address n have been stored in the read pointer 7, even if the branch history table 9 is searched by the high-order 29 bits of the address n so as to obtain the branch destination address of the branch instruction Bcc0 or Bcc1, both of the two entries storing the branch destination addresses hit and thus the desired branch destination address cannot be obtained. Also, where an instruction OP with a 32-bit displacement operand disp 32 is present at the position of an address n+6 as shown in the instruction alignment diagram in FIG. 9B, in predicting a branch instruction for branching to the address n+6 from a certain address, even if the branch destination address obtained from the branch history table 9 is the address n+6, the instruction code read from the instruction cache 8 does not include the displacement operand disp 32 and a wait is required for the decoding of the instruction OP until the displacement operand disp 32 is read out again.

SUMMARY OF THE INVENTION

It is an object of the present invention to provide an instruction fetching device including a cache device capable of supplying only the desired word length of an instruction code designated by any given read address irrespective of the instruction position and which further comprises a branch history table capable of reading the branch destination address of a branch instruction positioned nearest to the read address in the word supplied by an instruction cache with the read address as the origin, and an instruction fetch device capable of reading an instruction code of the desired word length from an instruction cache and also capable of effecting only the prediction of branching of the branch instruction to be executed first even if the branch instruction is present at any position in the instruction code read or a plurality of branch instructions are included in the instruction code.

To accomplish the above object, in accordance with the present invention there is thus provided a cache device which operates such that any entry whose stored address or a part thereof coincides with the read address, and at least one another entry holding the stored contents contiguous to the stored contents of the said entry are selected and a storage contents selecting means is provided to read the storage contents stored in the selected entries and thereby to select the storage contents by every storage unit in correspondence to the read address.

In accordance with another aspect of the present invention, there is provided a cache device which comprises a branch history table such that any entry whose stored identifying information coincides with identifying information identifying the stored contents subjected to a read operation and at least one another entry included in a given range defined by the stored identifying information are selected, and storage content selecting means is provided to select one of the selected at least one or more entries whose stored identifying information has the least difference from the identifying information identifying the storage contents subjected to the read operation and the storage contents stored in this entry are outputted.

In accordance with still another aspect of the present invention, there is provided an instruction fetch device so designed that instruction storage means including such cache device realizing an instruction cache is searched in accordance with the value of read address holding means and its stored instruction string of a predetermined word length is outputted. Simultaneously, if the output instruction string includes no branch instruction whose branch has been taken in the past, address incrementing means generates an address of an instruction string which is to be outputted next by the instruction storage means, whereas if the outputted instruction string includes any branch instruction whose branch has been taken in the past, branch predicting means including the cache device realizing the branch history table is searched in accordance with the value of the read address holding means thereby outputting the branch destination address of the branch instruction which is nearest to the read address and which is included in the instruction string read from the instruction storage means.

It is a further object of the present invention to provide an instruction fetching device including a cache device supplying an instruction code having a fixed length indicated by an instruction reading address regardless of the position at which a displacement operand accompanied by an instruction is disposed, and/or to provide an instruction fetching device including a branch history table capable of predicting a branch destination of a branch instruction to be performed first regardless of the position at which the branch instruction is present in a reading instruction code and even when a plurality of instructions are involved.

In order to achieve the further object, a cache device in an instruction fetching device in the present invention comprises a plurality of pairs of storage means for storing a plurality of pairs, each pair including an instruction string and an address specifying said instruction string, the instruction string being divided into minimum unit instructions and including a given number of words; searching means for selecting at least two pairs from the plurality of pairs of instruction strings and addresses stored in the storage means in accordance with an instruction reading address; and storage contents selecting means for selecting and outputting one instruction string by every minimum unit instruction from the instruction strings included in the at least two pairs selected by the searching means.

Furthermore, a branch history table in an instruction fetching device in the present invention comprises a plurality of pairs of storage means for storing a plurality of pairs, each pair including a branch destination address of a branch instruction and a set of an address of said branch instruction and a value obtained by subtracting a given value from said address; first searching means for selecting from the stored plurality of pairs each pair including the branch destination address and the set of the address of the branch instruction aid the value obtained by subtracting the given value from the address, a plurality of pairs each pair including the address of the branch instruction coincident with a pair or whole of an instruction reading address; first storage contents selecting means for selecting, from the plurality of pairs selected by the first search means, a pair in which a difference obtained by subtracting the instruction reading address from the address of the branch instruction is zero or a smallest positive value, and for outputting the branch destination address included in the selected pair; second searching means for selecting, from the stored plurality of pairs each pair including the branch destination address of the branch instruction and the set of the address of the branch instruction and the value obtained by subtracting the given value from said address, a plurality of pairs each pair including the value obtained by subtracting the given number from the address of the branch instruction coincident with a pair or whole of the instruction reading address; and second storage contents selecting means, when the first storage contents selecting means outputs nothing, for selecting, from the plurality of pairs selected by the second searching means, a pair in which a difference obtained by subtracting the instruction reading address from the value obtained by subtracting the given value from the address of the branch instruction is negative and has a smallest absolute value, and for outputting the branch destination address included in said selected pair.

BRIEF DESCRIPTION OF THE DRAWINGS

FIG. 3 is a detailed block diagram of the branch history table 4 in the first embodiment.

FIG. 4B shows the relation between the inputs A and B and the outputs OUT and CRY.

FIGS. 5A to 5E show instruction alignments useful for explaining the operation of the instruction cache 3 in the first and second embodiments, respectively.

FIG. 6 shows instruction alignments useful for explaining the operation of the branch history table 4 in the first embodiment.

Figures 9A, 9B:
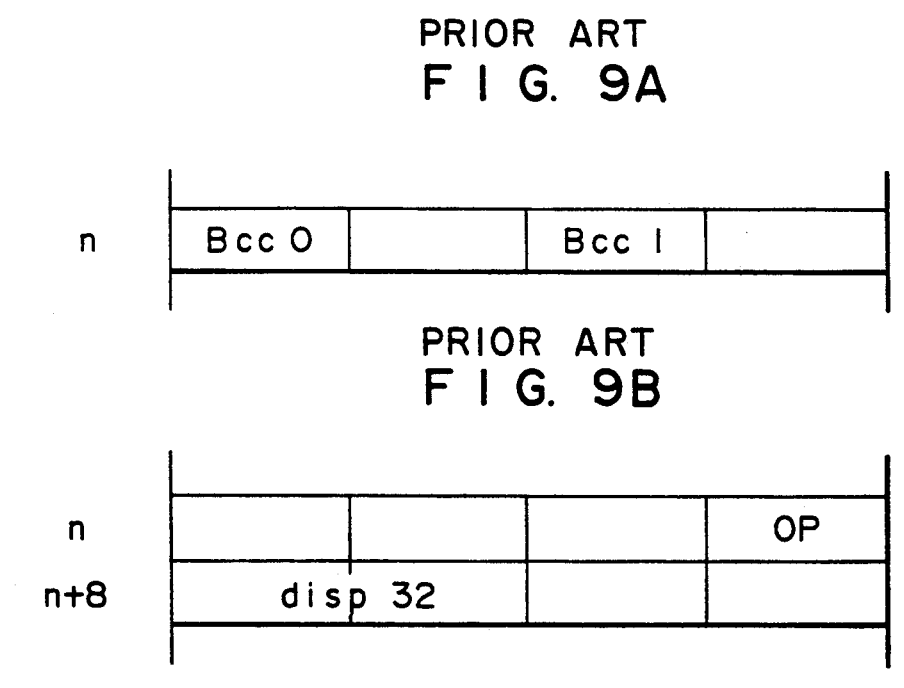

FIGS. 9A and 9B show instructions alignments useful for explaining the operation of a branch history table 9 in a conventional instruction fetch device.

DESCRIPTION OF THE PREFERRED EMBODIMENTS

Figure 1:
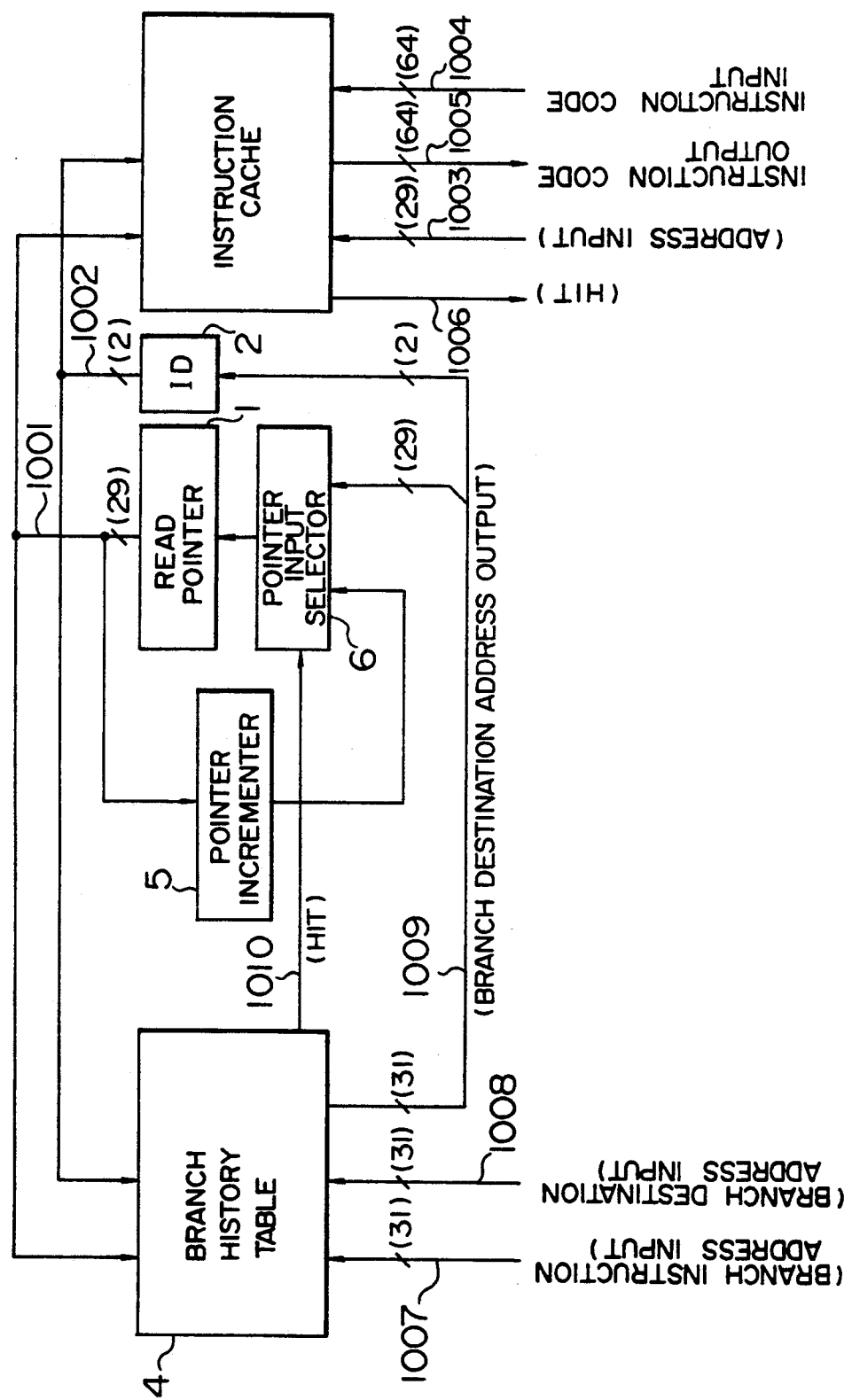
FIG. 1 is a block diagram showing an instruction fetch device according to a first embodiment of the present invention.

FIG. 1 is a block diagram showing an instruction fetching device according to a first embodiment of the present invention. In the instruction fetching device according to the first embodiment, the word length per instruction is an integral multiple of 16 bits (hereinafter referred to as a half word) and the instruction code is aligned on the half-word boundary (the lowest-order bit of the address is 0) of a 32-bit address space. Also, the address is assigned to each 8 bits and the instruction code is identified by the address assigned to its leading 8 bits. In FIG. 1, numeral 1 designates a read pointer for holding the high-order 29 bits of the leading address of a 4-half-word instruction code to be read, 2 a half-word identifying register for holding the 2 bits following the high-order 29 bits of the leading address of the 4-half-word instruction code to be read which is held in the read pointer 1 (the 2 bits following the high-order 29 bits of the address is hereinafter referred to as a half word identifying 2-bits), 3 an instruction cache for storing as a set each instruction code aligned on the 4-half-word boundary (the low-order 3 bits of the address are 0s) and its leading address and selecting the instruction code stored in the entry searched by the value of the read pointer 1 and the value of the half-word identifying register 2 to output the 4-half-word instruction code, 4 a branch history table for storing as a pair each address of a branch instruction whose branch has been taken and its branch destination address whereby the entry searched according to the value of the read pointer 1 and the value of the half-word identifying register 2 is selected to read the stored branch destination address, 5 a pointer incrementer for adding a 1 to the high-order 29 bits of the read address held in the read pointer 1, and 6 a pointer input selector responsive to the hit signal from the branch history table 4 to choose between the output of the pointer incrementer 5 or the high-order 29 bits of the read address which is increased by 1 and the high-order 29 bits of the branch destination address obtained from the branch history table 4.

Figure 2:
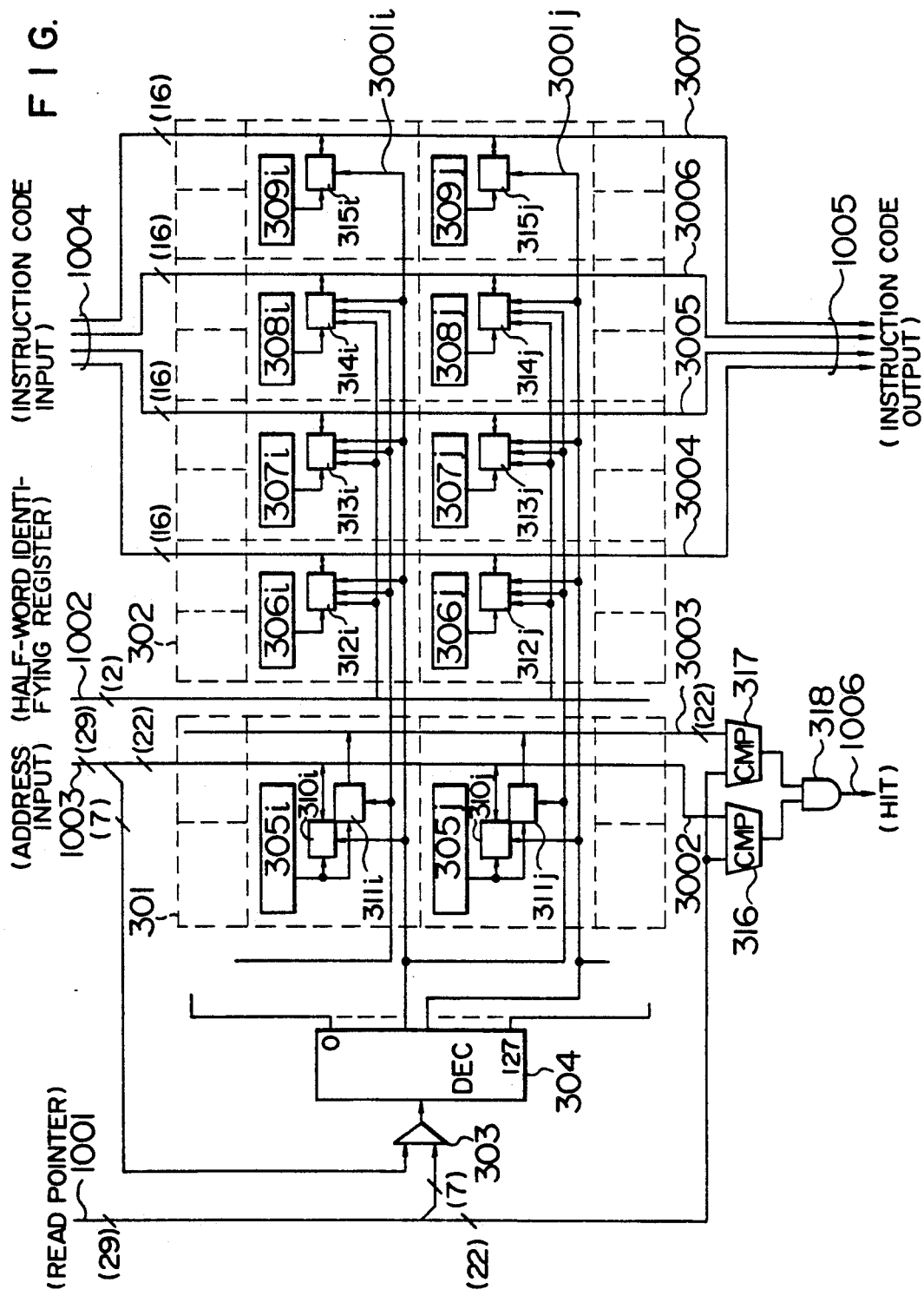
FIG. 2 is a detailed block diagram of the instruction cache 3 in the first embodiment.

FIG. 2 is a detailed block diagram of the instruction cache 3 shown in FIG. 1. In the Figure, numeral 301 designates an address tag section including 128 entries each storing the high-order 22 bits of an address and searched in accordance with the value of the read pointer 1, 302 a data section including 128 entries each storing a 64-bits instruction code aligned on a 4-half-word boundary whereby the instruction code in the entry searched in the address tag section 301 is selected by the value of the half-word identifying register 2 to output the 4-half-word instruction code, 303 a 7-bit selector, 304 an address decoder for decoding the high-order 7 bits or the 23rd to 29th bits of the address to select 2 entries for reading and writing purposes, 305 address latches each for holding the high-order 22 bits of an address, 306, 307, 308 and 309 are data latches for respectively holding the highest half word (hereinafter referred to as a first half word), the second highest half word (hereinafter referred to as a second half word), the third highest half word (hereinafter referred to as a third half word) and the lowest half word (hereinafter referred to as a fourth half word) of an instruction code aligned on a 4-half-word boundary, 310 address driver each for performing the reading and writing of the high-order 22 bits of the address with respect to one of the address latches 305 corresponding to one of the two entries selected by the address decoder 304 which is smaller in address, 311 address drivers each for performing the reading of the high-order 22 bits of the address with respect to one of the address latches 305 corresponding to one of the two entries selected by the address decoder 304 which is greater in address, 312 data drivers each for performing the writing of the first half word of the instruction code with respect to one of the data latches 306 corresponding to one of the two entries selected by the address decoder 304 which is smaller in address as well as the reading when the value of the half-word identifying register 2 is 0 and for performing the reading of the first half word of the instruction code with respect to the other data latch 306 corresponding to the other entry which is greater in address when the value of the half-word identifying register 2 is greater than 1, 313 data driver for each performing the writing of the second half word of the instruction code with respect to one of the data latches 307 corresponding to one of the two entries selected by the address decoder 304 which is smaller in address as well as the reading when the value of the half word identifying register 2 is smaller than 1 and for performing the reading of the second half word of the instruction code with respect to the other data latch 307 corresponding to the other entry which is greater in address when the value of the half-word identifying register 2 is greater than 2, 314 data drivers each for performing the writing of the third half word of the instruction code with respect to one of the data latches 308 corresponding to one of the two entries selected by the address decoder 304 as well as the reading when the value of the half-word identifying register 2 is less than 2 and for performing the reading of the third half word of the instruction code with respect to the other data latch 308 corresponding to the other entry which is greater in address when the value of the half-word identifying register 2 is 3, and 315 data drivers each for performing the writing and reading of the fourth half word of the instruction code with respect to one of the data latches 309 corresponding to one of the two entries selected by the address decoder 304 which is smaller in address. The suffixes i and j of the numerals 305 to 315 indicate respectively the ith and jth entries. Numeral 316 designates a first address tag comparator for detecting the presence of equality between the value of the address latch 305 corresponding to one of the two entries selected by the address decoder 304 which is smaller in address and the high-order 22 bits of the read address held in the read pointer 1, 317 a second address tag comparator for detecting the presence of equality between the value of the address latch 305 corresponding to one of the two entries selected by the address decoder 304 which is greater in address and the high-order 22 bits of the read address held in the read pointer 1, and 318 an AND circuit for producing the logical product of the outputs from the first and second address tag comparators 316 and 317 to generate a signal indicating that the instruction codes in the data sections of the two entries selected by the address decoder 304 are contiguous.

Referring now to FIG. 3, there is illustrated a detailed block diagram of the branch history table 4 shown in FIG. 1. In the Figure, numeral 401 designates an address tag section for storing the high-order 29 bits of the address of each branch instruction so as to be searched by the value of the read pointer 1, 402 a data section for storing the half-word identifying 2 bits of each branch instruction address and the high-order 31 bits of each branch destination address so that the entry searched in the address tag section 401 is selected in accordance with the half-word identifying 2 bits of the branch instruction address and the value of the half-word identifying register 2, thereby outputting the branch destination address, 403 address latches each for holding the high-order 29 bits of a branch instruction address, 404 pre-address latches each for holding the value obtained by subtracting 1 from the high-order 29 bits of a branch instruction address, 405 branch position identifying latches each for holding the half-word identifying 2 bits of a branch instruction address, 406 data latches each for holding the high-order 31 bits of a branch destination address, 407 first address tag comparators each for detecting the equality between the value of the address latch 403 and the read address held in the read pointer 1, 408 second address tag comparators each for detecting the equality between the value of the pre-address latch 404 and the read address held in the read pointer 1, 409 read entry preference circuits each so designed that of the entry where the value of the half-word identifying register 2 is equal to or greater than the value of the branch position identifying latch 405 with respect to the entries where the value of the address latch 403 detected by the first address tag comparator 407 is coincident with the read address and the entry where the value of the half-word identifying register 2 is smaller than the value of the branch position identifying latch 405 with respect to the entries where the value of the pre-address latch 404 detected by the second address tag comparator 408 is coincident with the read address, the entry where the difference between the value of the branch position identifying latch 405 and the value of the half-word identifying register 2 (the 2-bit unsigned subtraction result) is smallest is selected, and 410 data drivers each for reading and writing a branch destination address into the data latch 406. The suffixes i and j to the numerals 403 to 410 designate respectively the ith and jth entries. Numeral 411 designates an address subtractor for subtracting 1 from the high-order 29 bits of a branch instruction address, 412 an OR circuit for producing the logical sum of the outputs of the read entry preference circuits 409 of all the entries to generate a signal indicating that the branch history table 4 bits thereby outputting an effective branch destination address, and 417 a replace entry decision circuit for determining that entry which is written when storing a branch destination address in the data section 402.

Figure 4A:
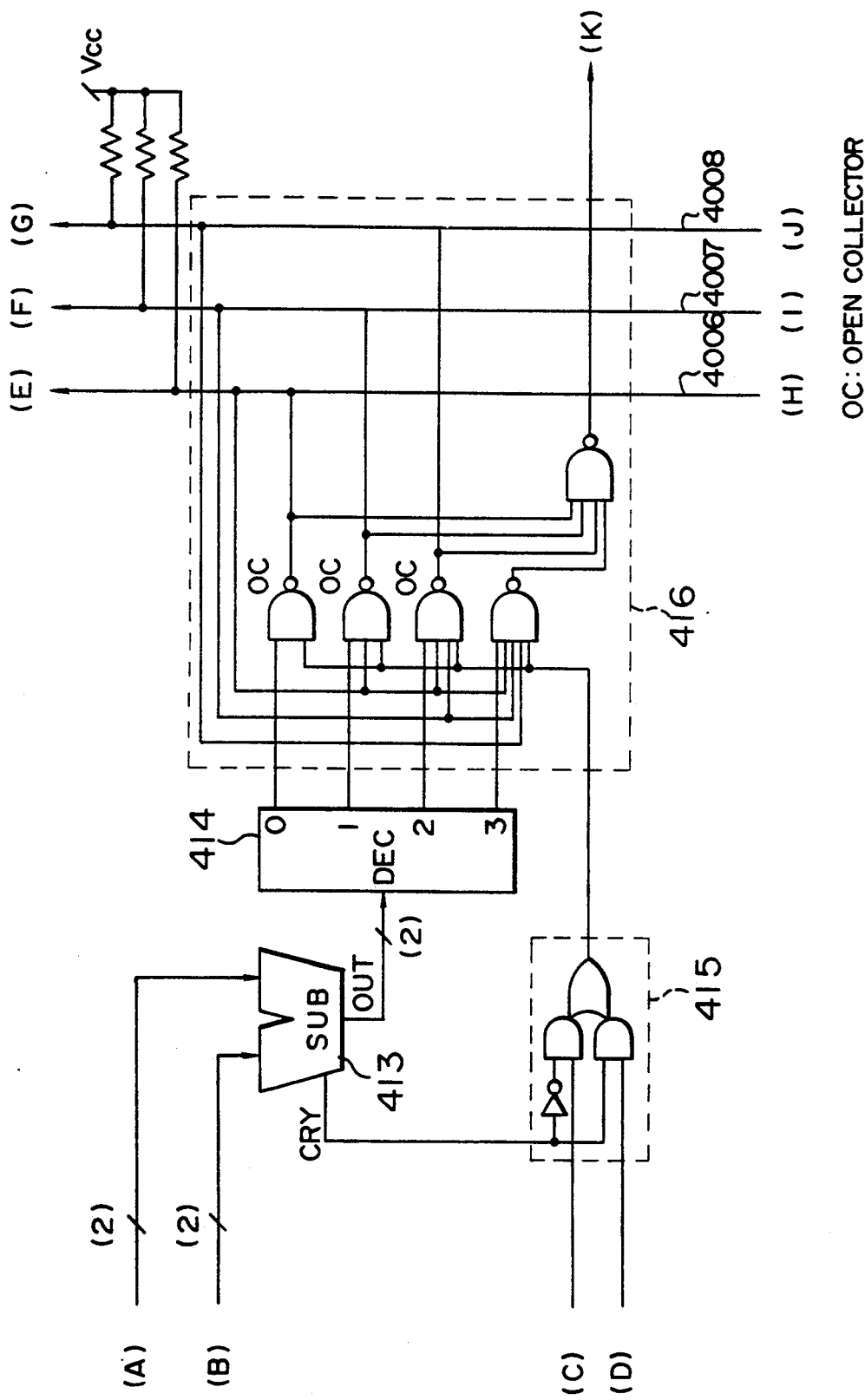
FIG. 4A is a detailed block diagram of the read entry preference circuit 409 of the branch history table 4 in the first embodiment.

FIG. 4A is a detailed block diagram of the read entry preference circuit 409 for each entry shown in FIG. 3. Numeral 413 designates a subtractor for receiving the value of the branch position identifying latch 405 as A input and the value of the half-word identifying register 2 as a B input to output the result OUT of the subtraction A-B and a carry CRY and the relations between the inputs A and B and the outputs OUT and CRY are as shown in FIG. 4B. Numeral 414 is a decoder for decoding the difference OUT from the subtracter 413, 415 a logical circuit for receiving the outputs of the first address tag comparator 407, the second address tag comparator 408 and the subtracter 413 so that the entry where the value of the half-word identifying register 2 is greater than or equal to the value of the branch position identifying latch 405 is selected from those where the value of the address latch 403 is equal to the read address and the entry where the value of the half-word identifying register 2 is smaller than the value of the branch position identifying latch 405 is selected from those where the value of the pre-address latch 404 is equal to the read address, and 416 a logical circuit responsive to the outputs of the decoder 414 to select from the entries selected by the logical circuit 415 the one which produces the minimum value when the value of the half-word identifying register 2 is subtracted from the value of the branch position identifying latch 405 (i.e., the value representing the unsigned 2-bit subtraction result).

With the construction described above, the operation of and the instruction fetching device according to the first embodiment will now be described.

The high-order 29 bits and the succeeding 2 bits of an address to be read are respectively stored in the read pointer 1 and the half-word identifying register 2 and simultaneously the instruction cache 3 is searched by the value of the read pointer 1 obtained through a signal line 1001.

Firstly, a description will be made of a case in which the address is the one which is to be read for the first time.

Since the address to be searched is the one which is read for the first time, the instruction cache 3 does not hit. At this time, the value of the half word identifying register 2 is ignored and a 4-half-word instruction code separated by a 4-half-word boundary is read from an external storage. At this time, the high-order 29 bits (the low-order 3 bits are 0s and not needed) of the read address and the 64-bit instruction code read are respectively stored through signal lines 1003 and 1004 into the instruction cache 3. In the instruction cache 3, of the 29-bit address obtained from the signal line 1003 the low-order 7 bits are applied to the address decoder 304 through the selector 303 and the entry for storing them is selected. Assuming now that the ith entry shown in FIG. 2 is selected, of the outputs from the address decoder 304, the signal appears only on a signal line 3001i. The signal on the signal line 3001i brings the address driver 310i into operation so that the high-order 22 bits of the address are inputted from the signal line 1003 and are written into the address latch 305i. Similarly, the data drivers 312i, 313i, 314i and 315i are brought into operation so that the first, second, third and fourth half words of the instruction code are inputted through the signal lines 1004 and are written into the data latches 306i, 307i, 308i and 309i, respectively. Although the signal line 3001i is also connected to the address drivers 311j, 312j, 313j and 314j, all of them are not operated during the writing.

Paralleling the above mentioned operation, the pointer incrementer 5 adds 1 to the high-order 29 bits of the read address in the read pointer 1. However, if this incremented address is the one which is read for the first time, the instruction cache 3 does not hit and the previously mentioned storing of an instruction code in the instruction cache 3 is repeated.

Where the 4-half-word instruction code read from the external storage is decoded and executed by an external decode and execution unit so that the instruction code includes a branch instruction and a branch is taken, independently of the storing of the instruction code in the instruction cache 3, the high-order 31 bits of the branch instruction address and the high-order 31 bits of the branch destination address (in the both cases the lowest-order bit is 0 and not needed) are respectively stored through signal lines 1007 and 1008 in the branch history table 4. In the branch history table 4, the replace entry decision circuit 417 selects the desired entry for storage. Assuming now that the ith entry shown in FIG. 3 is selected, the high-order 29 bits of the branch instruction address are inputted through the signal line 1007 and written into the address latch 403i and simultaneously the high-order 29 bits are decreased by 1 and written into the pre-address latch 404i through the address subtracter 411 and a signal line 4004. At the same time, the half-word identifying 2 bits of the branch instruction address are written into the branch position identifying latch 405i, and also the data driver 410i is operated so that the high-order 31 bits of the branch destination address are inputted through the signal line 1008 and are written into the data latch 406i.

Next, a description will be made of a case in which an instruction code has been read from the external storage and already stored in the instruction cache 3 so that its read address is divided into the high-order 29 bits and the succeeding 2 bits and they are respectively assigned to the read pointer 1 and the half-word identifying register 2. In this case, the read address need not be the one on the 4-half-word boundary.

The address to be searched is equal to the address held in the address tag section 301 and therefore the instruction cache 3 hits. In other words, in the instruction cache 3 the low-order 7 bits of the 29-bit address inputted from the read pointer 1 through the signal line 1001 are applied to the address decoder 304 through the selector 303 to select the entry to be read. Assuming now that the ith entry shown in FIG. 2 is selected, the address decoder 304 generates its outputs so that the signal appears only on the signal line 3001i. In response to the signal on the signal line 3001i, the address drivers 310i and 310j come into operation so that the values of the address latch 305i and the address latch 305j are respectively read onto signal lines 3002 and 3003 and are compared with the high-order 22 bits of the read address from the read pointer 1 in the first and second address tag comparators 316 and 317. Since the values read onto the signal lines 3002 and 3003 represent the high-order 22 bits of the address which has been read in the past, the comparison exists in the both cases and the AND circuit 318 generates on a signal line 1006 a hit signal indicating that the instruction codes in the data parts of the ith and jth entries are contiguous. Also, while the signal on the signal line 3001i brings the data drivers 312i to 314j into operation, their operations differ depending on the value of the half-word identifying register 2 obtained through a signal line 1002. This fact will now be described with reference to the instruction alignment diagrams of FIGS. 5A to 5E. Shown in FIG. 5A is the case where an instruction code OP-0–OP7 including 8 half words is present following an address n on the 4-half-word boundary.

(1) When the value of the half-word identifying register 2 is 0

In response to the signal on the signal line 3001i and the value of the signal line 1002, the data drivers 312i, 313i, 314i and 315i come into operation so that the first, second, third and fourth half words $OP_0$, $OP_1$, $OP_2$ and $OP_3$ of the instruction code which are respectively held in the data latches 306i, 307i, 308i and 309i and aligned on the 4-half-word boundary are outputted onto signal lines 3004, 3005, 3006 and 3007, thereby producing the instruction code including four half words beginning at the first half word on the 4-half-word boundary indicated by the read address n stored in the read pointer 1 and the half-word identifying register 2 through signal lines 1005 as shown in FIG. 5B.

(2) When the value of the half-word identifying register 2 is 1

In response to the signal on the signal 3001i and the value of the signal line 1002, the data drivers 313i, 314i, 315i and 312j come into operation so that the second, third and fourth half words $OP_1$, $OP_2$ and $OP_3$ of the instruction code aligned on the 4-half-word boundary which are respectively held in the data latches 307i, 308i and 309i and the first half word $OP_4$ of the instruction code aligned on the upwardly contiguous 4-half-word boundary which is held in the data latch 306j, are respectively outputted onto the signal lines 3005, 3006, 3007 and 3004, thereby producing the instruction code including the four half words beginning at the second half word on the 4-half-word boundary indicated by the read address n+2 stored in the read pointer 1 and the half word identifying register 2 through the signal lines 1005 as shown in FIG. 5C.

(3) When the value of the half-word identifying register 2 is 2

In response to the signal on the signal line 3001i and the value of the signal line 1002, the data drivers 314i, 315i, 312j and 313j come into operation so that the third and fourth half words $OP_2$ and $OP_3$ of the instruction code aligned on the 4-half-word boundary which are respectively held in the data latches 308i and 309i and the first and second half words $OP_4$ and $OP_5$ of the instruction code aligned on the upwardly contigious 4-half-word boundary which are respectively held in the data latches 306j and 307j, are respectively outputted onto the signal lines 3006, 3007, 3004 and 3005, thereby producing the instruction code including the four half words beginning at the third half word on the 4-half-word boundary indicated by the read address n+4 stored in the read pointer 1 and the half-word identifying register 2 through the signal lines 1005 as shown in FIG. 5D.

(4) When the value of the half-word identifying register 2 is 3

In response to the signal on the signal line 3001i and the value of the signal line 1002, the data drivers 315i, 312j, 313j and 314j come into operation so that the fourth half word $OP_3$ of the instruction code aligned on the 4-half-word boundary which is held in the data latch 309i and the first, second and third half words $OP_4$, $OP_5$ and $OP_6$ of the instruction code aligned on the upwardly contiguous 4-half-word boundary which are respectively held in the data latches 306j, 307j and 308j, are respectively outputted onto the signal lines 3007, 3004, 3005 and 3006, thereby producing the instruction code including the four half words beginning at the fourth half word on the 4-half-word boundary indicated by the read address n+6 stored in the read pointer 1 and the half-word identifying register 2 through the signal lines 1005 as shown in FIG. 5E.

At this time, if a branch instruction is included in the instruction code outputted from the instruction cache 3 and if its branch has been taken in the past, the possibility of the branch being taken again this time is high. For this reason, the branch history table 4 is searched by the value of the read pointer 1 which is also obtained from the signal line 1001. This operation will be explained with reference to the case of the instruction alignment diagram of FIG. 6. The Figure shows the case in which branch instructions Bcc0, Bcc1, Bcc2 and Bcc3, each composed of a half word, are respectively arranged at positions n+2, n+6, n+12 and n+14 relative to the address n on the 4-half-word boundary. Let it be assumed that these four branch instructions have been executed in the past so that the branches have been taken and the corresponding branch destination addresses, etc., have been stored in the branch history table 4. Assuming now that the information relating to the branch instruction Bcc0 is stored in the ith entry of the branch history table 4, the information relating to the branch instruction Bcc1 in the jth entry, the information relating to the Bcc2 in the kth entry and the information relating to the branch instruction Bcc3 in the mth entry, the high-order 29 bits of the addres n are stored in each of the address latches 403i and 403j, the high-order 29 bits of the address n+8 (i.e., the high-order 29 bits of the address n plus 1) in each of the address latches 403k and 403m, the high-order 29 bits of the address n minus 1 in each of the pre-address latches 404i and 404j, and the high-order 29 bits of the address n+8 minus 1 (i.e., the high-order 29 bits of the address n). Also, 1 is stored in the branch position identifying latch 405i, 3 in the branch position identifying latch 405j, 2 in the branch position identifying latch 405k and 3 in the branch position identifying latch 405m. Further, the high-order 31 bits of the branch destination address of the branch instruction Bcc0 are stored in the data latch 406i, the high-order 31 bits of the branch destination address of the branch instruction Bcc1 in the data latch 406j, the high-order 31 bits of the branch destination address of the branch instruction Bcc2 in the data latch 406k and the high-order 31 bits of the branch destination address of the branch instruction Bcc3 in the data latch 406m. Although the component elements with suffixes k and m are not shown in FIG. 3, they are the same as the elements with the suffixes i and j.

Assume a case in which the four half words following the hatched address n+6 in FIG. 6 are read from the instruction cache 3. In this case, the value of the read pointer 1 represents the high-order 29 bits of the address n and the value of the half-word identifying register 2 is 3. In the first address tag comparators 407, the equality between the high-order 29 bits of the address n obtained from the signal line 1001 and the value of the address latch 403 is detected so that the first address tag comparator 407i of the ith entry generates a signal on a signal line 4001i and the first address tag comparator 407j of the jth entry generates a signal on a signal line 4001j. Also, in the second address tag comparators 408, the equality between the high-order 29 bits of the address n obtained from the signal line 1001 and the value of the pre-address latch 404 is detected so that the second address tag comparator 408k of the kth entry generates a signal on a signal line 4002k and the second address tag comparator 408m generates a signal on a signal line 4002m. In response to the signals on the signal lines 4001 and 4002, the read entry preference circuits 409 of the respective entries operate in the following manner.

(1) The read entry preference circuit 409i of the ith entry

The subtractor 413i subtracts the value of the half-word identifying register 2 from the value of the branch position identifying latch 405i so that the carry CRY becomes 0 and the logical circuit 415i generates a logical 0. In response to this output, a logical 1 is generated from the gate of each of the three open collectors of the logical circuit 416i and therefore signal lines 4006, 4007 and 4008 are not caused to go to a low potential. Also, a logical 0 is generated on the signal line 4003i. The foregoing is due to the fact that the branch instruction Bcc0 is not included in the four half words read from the instruction cache 3.

(2) The read entry preference circuit 409j of the jth entry

The subtrator 413j subtracts the value of the half-word identifying register 2 from the value of the branch position identifying latch 405j so that the carry CRY becomes 1 and the logical circuit 415j generates a logical 1 in response to the carry CRY and the logical 1 appearing on the signal line 4001j. Also, the value of the difference OUT becomes 0 and the decoder 414j changes its output lines at 0 to a logical 1. In response to these inputs, the logical circuit 416j generates a logical 0 at the gate of the highest-stage open collector so that the signal line 4006 goes to the low potential and a logical 1 is generated on the signal line 4003j. The foregoing operation is due to the fact that the branch instruction Bcc1 is included in the four half words read from the instruction cache 3 and that the address of the branch instruction Bcc1 is nearest to the read address.

(3) The read entry preference circuit 409k of the kth entry

The subtracter 413k subtracts the value of the half-word identifying register 2 from the branch position identifying latch 405k so that the carry CRY becomes 0 and the logical circuit 415k generates a logical 1 in response to the carry CRY and the logical 1 produced on the signal line 4002k. Also, the value of the difference OUT becomes 3 and the decoder 414 changes its output line indicating 3 to a logical 1. However, since the signal line 4006 is at the low potential or the logical 0, the logical circuit 416k cannot generate a logical 0 at any of the open collector gates and a logical 0 is generated on the signal line 4003k. The foregoing operation is due to the fact that while the branch instruction Bcc2 is included in the four half words read from the instruction cache 3, there exists another branch instruction at the closer address to the read address.

(4) The read entry preference circuit 409m of the mth entry

The subtracter 413m subtracts the value of the half-word identifying register 2 from the value of the branch position identifying latch 405m so that the carry CRY becomes 1 and the logical circuit 415m generates a logical 0. In response to the logical 0, the logical circuit 416m generates a logical 1 at the gate of each of its three open collectors and the signal lines 4006, 4007 and 4008 are prevented from going to the low potential. Also, a logical 0 is generated on the signal line 4003m. The foregoing operation is due to the fact that the branch instruction Bcc3 is not included in the four half words read from the instruction cache 3.

In response to the read entry preference circuit 409j through the signal line 4003j, the data driver 410j comes into operation and the high-order 31 bits of the branch destination address of the branch instruction Bcc1, which is held in the data latch 406j, are outputted onto a signal line 1009. Also, in response to the signal line 4003j, the logical circuit 412 outputs a hit signal on a signal line 1010.

In response to the hit signal on the signal line 1010, the pointer input selector 6 switches the input of the read point 1 from the output of the pointer incrementer 5 to the high-order 29 bits of the branch destination address of the branch instruction Bcc1 received from the branch history table 4 through the signal line 1009 and simultaneously the low-order 2 bits from the signal line 1009 or the half-word identifying 2 bits of the branch destination address of the branch instruction Bcc1 are stored in the half-word identifying register 2. Then, in accordance with the values of the read pointer 1 and the half-word identifying register 2, the instruction cache 3 similarly reads the four half words indicated by the branch destination address of the branch instruction Bcc1.

From the foregoing it will be seen that in accordance with the present embodiment the instruction fetching device including the instruction cache is realized in which the address decoder 304 selects two of the entries so that the address tags of these entries are respectively compared in the first and second address tag comparators 316 and 317 to verify that the instruction codes stored in the two entries are contiguous and also the data drivers 312 to 315 are controlled in accordance with the value of the half-word identifying register 2, thereby reading the instruction code of 4 half words long, which is indicated by any given read address, from the two entries irrespective of the instruction alignment.

Further, in accordance with the present the invention fetching device including the branch history table is realized in which each of the entries is provided with the pre-address latch 404 for storing the address on the 4-half-word boundary preceding the address on the 4-half-word boundary of a branch instruction and the second address tag comparator 408 for detecting the presence of equality between the stored address and the read address thereby extracting all the entries storing the branch destination addresses of the branch instructions present in the 8 half words aligned on the 4-half-word boundaries completely containing each 4 half words read from the instruction cache 3, and the necessary selection is effected by the read entry preference circuit 409 in accordance with the values of the half-word identifying register 2 and the half-word identifying 2 bits of each of the branch instruction addresses, thus reading the branch destination address of the branch instruction arranged in the nearest position to the read address within the 4 half words beginning at the read address.

Still further, in accordance with the present embodiment the instruction fetching device is realized in which the instruction cache 3 and the branch history table 4 are searched by the read address so that when the branch history table 4 hits, the instruction cache 3 and the branch history table 4 are searched again by the branch destination address obtained from the branch history table 4 with the result that an instruction code having a fixed length indicated by an instruction read address can be supplied irrespective of the position at which a displacement operand associated with an instruction is disposed alignment and that the prediction of the branch of that branch instruction which is to be executed first is performed irrespective of the position of the branch instruction in the instruction code read and irrespective of the number of branch instructions included in the instruction code.

Figure 7:
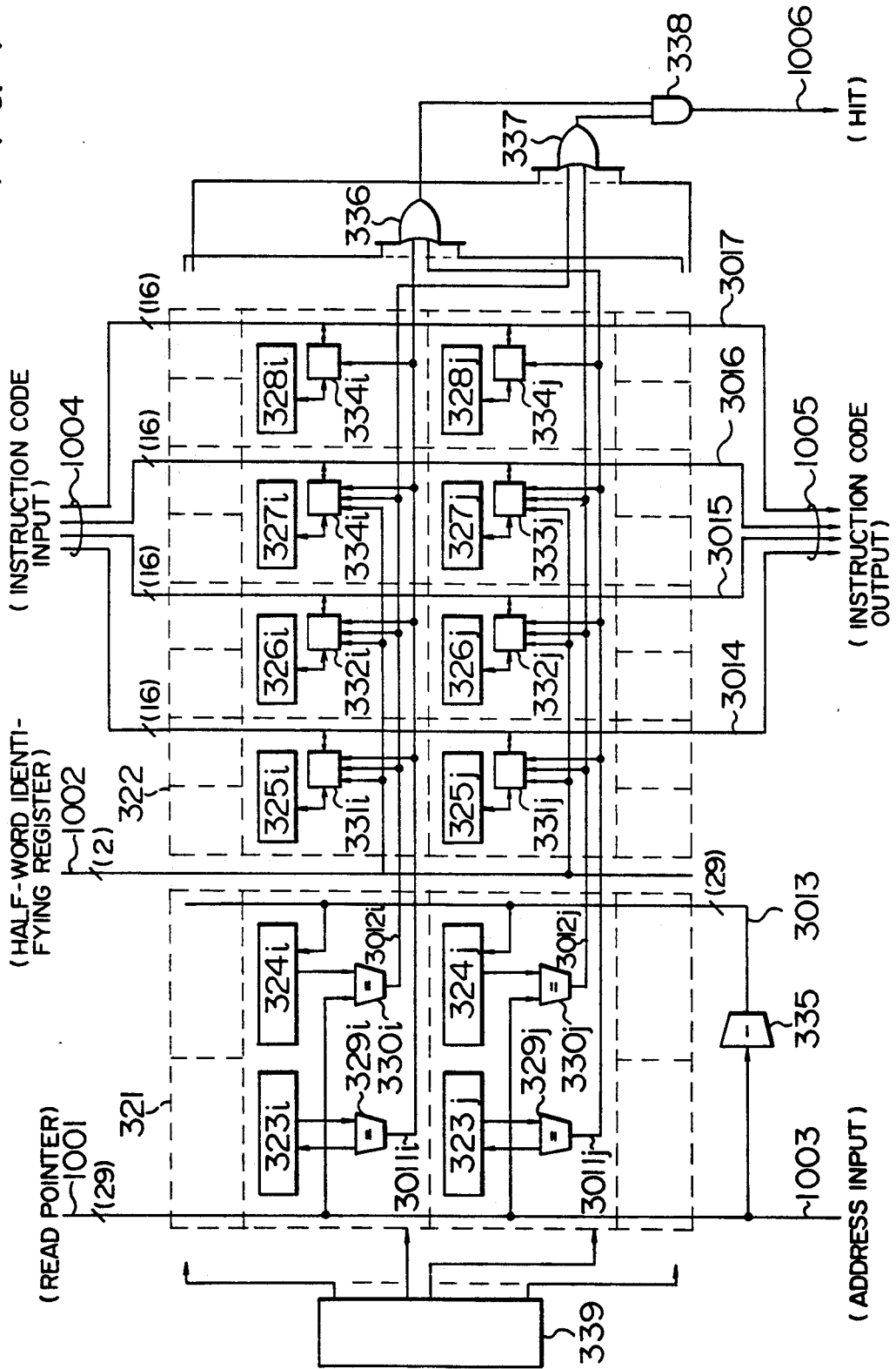
FIG. 7 is a detailed block diagram showing an instruction cache device in an instruction fetch device in the second embodiment.
Figure 8:
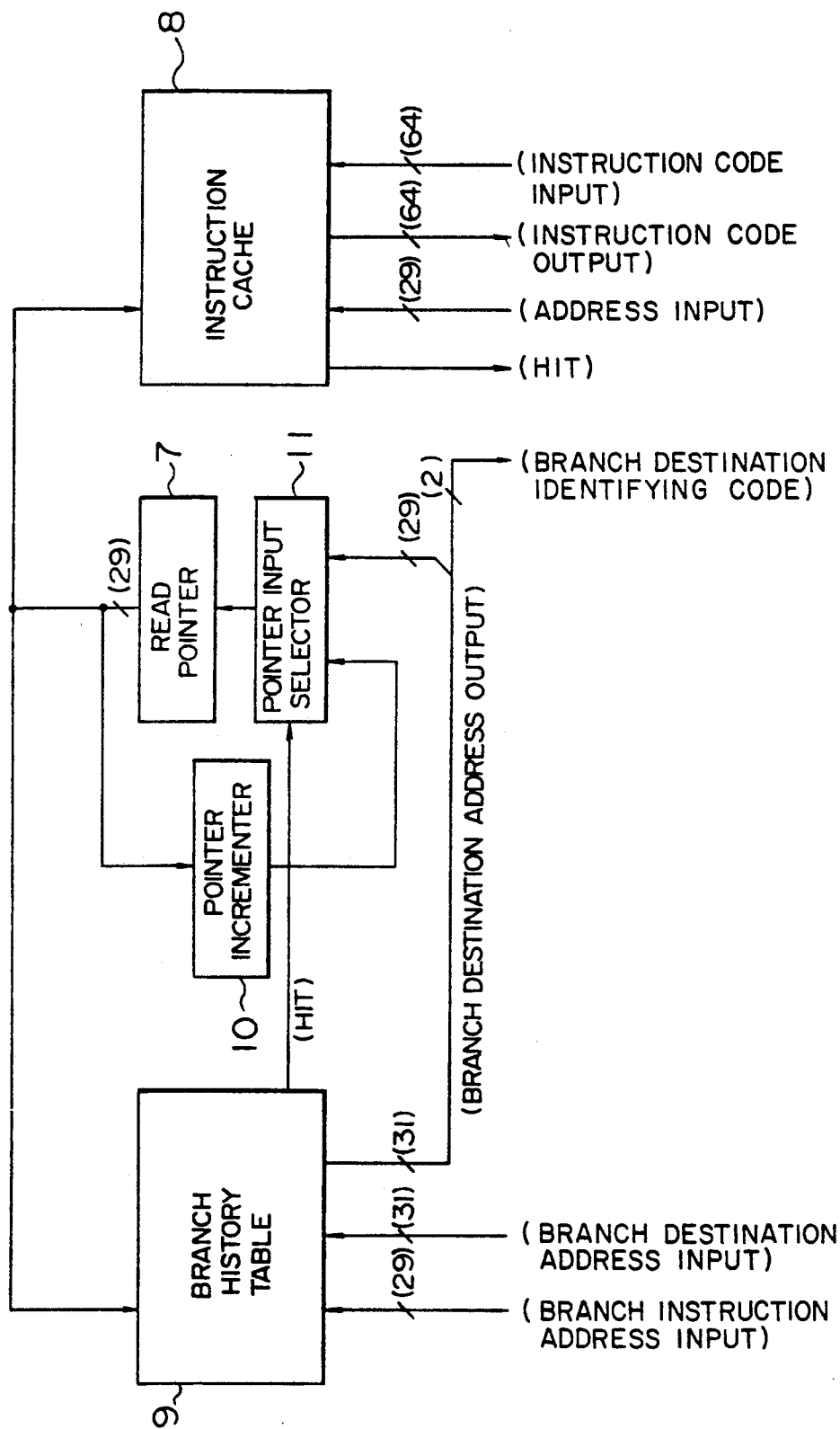
FIG. 8 is a block diagram showing a conventional instruction fetching device.

Referring to FIG. 7, there is illustrated a detailed block diagram of the instruction cache 3 in an instruction fetching device according to a second embodiment of the present invention. The remaining component parts are the same as in the first embodiment shown in FIG. 1. In FIG. 7, numeral 321 designates an address tag section for storing the high-order 29 bits of each address and effecting a search by the value of the read pointer 1, 322 a data section for storing each 64-bit instruction code aligned on a 4-half-word boundary and selecting the instruction code of the entry searched by the address tag section 321 by the value of the half-word identifying register 2 to output the instruction code of 4 half words long, 323 data latches each for holding the high-order 29 bits of an address, 324 pre-address latches each for holding a value obtained by subtracting 1 from the high-order 29 bits of an address, 325, 326, 327 and 328 data latches for respectively holding the first, second, third and fourth half words of an instruction code aligned on a 4-half-word boundary, 329 first address tag comparators each for detecting the presence of equality between the value of the address latch 323 and the read address held in the read pointer 1, 330 second address tag comparators each for detecting the presence of equality between the value of the pre-address latch 324 and the read address held in the read pointer 1, 331 data drivers each for writing the first half word in the data latch 325 of the entry into which the instruction code is written, reading the data latch 325 of the entry for which the equality is detected by the first address tag comparator 329 when the value of the half-word identifying register 2 is 0 and reading the data latch 325 of the entry for which the equality is detected by the second address tag comparator 330 when the value of the half-word identifying register 2 is greater than 1, 332 data drivers each for writing the second half word in the data latch 326 of the entry into which the instruction code is written, reading the data latch 326 of the entry for which the equality is detected by the first address tag comparator 329 when the value of the half-word identifying register 2 is less than 1 and reading the data latch 326 of the entry for which the equality is detected by the second address tag comparator 330 when the value of the half-word identifying register 2 is greater than 2, 333 data drivers each for writing the third half word in the data latch 327 of the entry into which the instruction code is written, reading the data latch 327 of the entry for which the equality is detected by the first address tag comparator 329 when the value of the half-word identifying register 2 is less than 2 and reading the data latch 327 of the entry for which the equality is detected by the second address tag comparator 330 when the value of the half-word identifying register 2 is 3, and 334 data drivers each for writing the fourth half word in the data latch 328 of the entry into which the instruction code is written and reading the data latch 328 of the entry for which the equality is detected by the first address tag comparator 329. The suffixes i and j of the numerals 323 to 334 designate respectively the ith and jth entries. Numeral 335 designates an address subtracter for decreasing the high-order 29 bits of an address by 1, 336 a first OR circuit for producing the logical sum of the outputs from all the first address tag comparators 329, 337 a second OR circuit for producing the logical sum of the outputs from all of the second address tag comparators 330, 338 an AND circuit for producing the logical product of the outputs from the first and second OR circuits 336 and 337 to generate a signal indicating that the instruction codes of the entries for which the equality is detected by the first and second address tag comparators 329 and 330, respectively, are contiguous, and 339 a replace entry decision circuit for determining the entry to be written when storing the instruction code in the data section 322.

With the construction described above, the operation of the instruction fetching device according to the second embodiment will now be described. In this case, however, a description will be made only of the writing and reading operations of the instruction cache 3 which are different from the first embodiment.

The writing in the instruction cache 3

Ignoring the value of the half-word identifying register 2, an instruction code of 4 half words long, which is separated by a 4-half-word boundary, is read from an external storage and at this time the high-order 29 bits of the read address (the low-order 3 bits are 0s and are not needed) the 64-bit instruction code read are respectively stored through signal lines 1003 and 1004 in the instruction cache 3. In the instruction cache 3, the entry for storage is selected by the replace entry decision circuit 339. Assuming now that the ith entry shown in FIG. 7 is selected, the high-order 29 bits of the address are written into the address latch 323$i$ through the signal line 1003 and also the address subtracter 335 decreases the same 29 bits by 1 and writes them in the pre-address latch 324$i$ through a signal line 3013. Similarly, the data drivers 331$i$, 332$i$, 333$i$ and 334$i$ come into operation so that the first, second, third and fourth half words of the instruction code are inputted through the signal lines 1004 and written into the data latches 325$i$, 326$i$, 327$i$ and 328$i$, respectively.

The reading from the instruction cache 3

In this case, the read address need not be the one on the 4-half-word boundary. For purposes of simplicity, a description will be made by referring again to the case of the instruction alignment diagrams of FIGS. 5A to 5E. Assuming now that the 4-half-word instruction code having the address n on the 4-half-word boundary is stored in the ith entry and the 4-half-word instruction code of the address n+8 on the next 4-half-word boundary is stored in the jth entry, the high-order 29 bits of the address n is stored in the address latch 323$i$, the high-order 29 bits of the address n+8 (i.e., the high-order 29 bits of the address n plus 1) in the address latch 323$j$, the high-order 29 bits of the address n minus 1 in the pre-address latch 324$i$, the high-order -29 bits of the address n+8 minus 1 (i.e., the high-order 29 bits of the addres n) in the pre-address latch 324$j$, the instruction code $OP_0-OP_3$ in the data latches 325$i$ to 328$i$ and the instruction code $OP_4-OP_7$ in the data latch 325$j$ to 328$j$. Assume a case in which this instruction cache 3 is read by the read address which is any one of the addresses n, n+2, n+4 and n+6. At this time, the value of the read pointer 1 represents the high-order 29 bits of the address n and the value of the half-word identifying register 2 is 0, 1, 2 or 3. In the first address tag comparators 329, the presence of equality between the high-order 29 bits of the address n received from the signal line 1001 and the value of the address latches 323 is detected and the first address tag comparator 329$i$ of the ith entry generates a signal on a signal line 3011$i$. Also, in the second address tag comparators 330, the presence of equality between the high-order 29 bits of the address n received from the signal line 1001 and the value of the pre-address latches 324 is detected and the second address tag comparator 330j of the jth entry generates a signal or a signal line 3012j. In response to the signals on the signal lines 3011i and 3012j, the data drivers 331i to 334j come into operation and their operations differ in dependence on the value of the half-word identifying register 2 obtained from the signal line 1002.

(1) When the value of the half-word identifying register 2 is 0

In response to the signal on the signal line 3011i and the value of the signal line 1002, the data drivers 331i, 332i, 333i and 334i come into operation so that of the instruction code aligned on the 4-half-word boundary, the first half word $OP_0$, the second half word $OP_1$, the third half word $OP_2$ and the fourth half word $OP_3$, which are respectively held in the data latches 325i, 326i, 327i and 328i, are outputted on signal lines 3014, 3015, 3016 and 3017, thereby producing the instruction code including the 4 half words beginning at the first half word on the 4-half-word boundary indicated by the read address n stored in the read pointer 1 and the half-word identifying register 2 through the signal lines 1005 as shown in FIG. 5B.

(2) When the value of the half-word identifying register 2 is 1

The data drivers 332i, 333i and 334i come into operation in response to the signal on the signal line 3011i and the value of the signal line 1002 and the data driver 331j comes into operation in response to the signal on the signal line 3012j so that of the instruction code aligned on the 4-half-word boundary the second half word $OP_1$, the third half word $OP_2$ and the fourth half word $OP_4$, which are respectively held in the data latches 326i, 327i and 328i, and the first half word $OP_4$ of the instruction code aligned on the upwardly contiguous 4-half-word boundary, which is held in the data latch 325j, are respectively outputted on the signal lines 3015, 3016, 3017 and 3014, thereby producing the instruction code including the four half words beginning at the second half word on the 4-half-word boundary indicated by the read address n+2 stored in the read pointer 1 and the half-word identifying register 2 through the signal lines 1005 as shown in FIG. 5C.

(3) When the value of the half-word identifying register 2 is 2

The data drivers 333i and 334i come into operation in response to the signal on the signal line 3011i and the value of the signal line 1002 and the data drivers 331j and 332j come into operation in response to the signal on the signal line 3012j and the value of the signal line 1002 so that the third half word $OP_2$ and the fourth half word $OP_3$ of the instruction code aligned on the 4-half-word boundary, which are respectively held in the data latches 327i and 328i, and the first half word $OP_4$ and the second half word $OP_5$ of the instruction code aligned on the upwardly contiguous 4-half-word boundary, which are respectively held in the data latches 325j and 326j, are respectively outputted on the signal lines 3016, 3017, 3014 and 3015, thereby producing the instruction code including the 4 half words beginning at the third half word on the 4-half-word boundary indicated by the read address n+4 stored in the read pointer 1 and the half-word identifying register 2 through the signal lines 1005 as shown-in FIG. 5D.

(4) When the value of the half word identifying register 2 is 3

The data driver 334i comes into operation in response to the signal on the signal line 3011i and the value of the signal line 1002 and the data drivers 331j, 332j and 333j come into operation in response to the signal on the signal line 3012j and the value of the signal line 1002 so that the fourth half word $OP_3$ of the instruction code aligned on the 4-half-word boundary, which is held in the data latch 328i, and the first half word $OP_4$, the second half word $OP_5$ and the third half word $OP_6$ of the instruction code aligned on the upwardly contiguous 4-half-word boundary, which are respectively held in the data latches 325j, 326j and 327j, are respectively outputted on the signal lines 3017, 3014, 3015 and 3016, thereby producing the instruction code including the four half words beginning at the fourth half word on the 4-half-word boundary indicated by the read address n+6 stored in the read pointer 1 and the half-word identifying register 2 through the signal lines 1005 as shown in FIG. 5E.

Also, in response to the signals from the signal lines 3011i and 3012j, each of the OR circuits 326 and 337 generates a logical 1 signal and the AND circuit 338 generates a signal indicating that the ith and jth entries hit and their instruction codes are contiguous.

From the foregoing description it will be seen that in accordance with the second embodiment the instruction fetching device including the instruction cache capable of reading an instruction code is realized in which each entry is 10 provided with the pre-address latch 324 for storing the address on the 4-half-word boundary preceding the address on the 4-half-word boundary of an instruction code and the second address tag comparator 330 for detecting the presence of equality between the value of the former and the read address whereby two of the entries are extracted which include the address on the 4-half-word boundary held in the read pointer and the address on the next 4-half-word boundary in the address tag section 321, and the data drivers 331 to 334 are controlled in accordance with the value of the half-word identifying register 2, thereby reading the instruction code of a 4-half-word word length by the given read address from these two entries irrespective of the instruction alignment.

It is to be noted that while, in the first embodiment, during the reading of the instruction cache 3 it is verified that the instruction codes in the data sections of the succeeding two entries selected by the first address tag comparator 316 and the second address tag comparator 317 are the contiguous codes, it is possible to arrange so that in the instruction cache 3 each of the entries is provided with a flag indicating that the instruction code of this entry is contiguous to the instruction code of the preceding entry and these flags are set when storing the contiguous instruction codes in the succeeding entries, thereby allowing to verify during reading that the instruction codes in the data sections of the selected succeeding two entries are contiguous by means of the flags.

Also, while, in the first embodiment, there are provided the data drivers 312 to 314 which are controlled in response to the output lines of the address decoder 304 and the value of the half-word identifying register 2 and the data drivers 315 which are operated in response to only the outputs of the address decoder 304 whereby the desired 4 half words are selected from the 8 half words stored in the data latches 306 to 309 of the two entries selected by the address decoder 304 and are outputted, it is possible to arrange so that there are provided data drivers which are operated in response to only the outputs of the address decoder 304 whereby the 8 half words stored in the data latches 306 to 309 of the two entries selected by the address decoder 304 or the 7 half words excluding the last half word are outputted and the desired 4 half words are selected from these 8 or 7 half words in accordance with the value of the half-word identifying register 2 externally of the instruction cache 3.

Further, while, in the first embodiment, the number of entries in the instruction cache 3 is set to 128, the embodiment can be worked out by using any arbitrary number of entries. If the number of entries is selected the nth power of 2 (in this embodiment n=7), it is only necessary to select so that the number of bits is n in the selector 303 and the address decoder 304 and the number of bits is 29-n in all the component elements of the address tag section 301 and the first and second address tag comparators 316 and 317.

Still further, while, in the first or second embodiment, the 4 half words aligned on a 4-half-word boundary are stored in each entry of the data section 302 or 322 in the instruction cache 3 to select the desired 4 half words from the two entries holding the contiguous instruction codes, it is possible to store only 2 half words or single half word aligned on a 2-half-word boundary in each entry of the data section thereby selecting the desired 4 half words from the 3 or 4 entries holding the contiguous instruction codes or conversely to store an instruction code of more than 8 half words aligned on a 8-half-word boundary in each entry of the data section thereby selecting the desired 4 half words from the two entries holding the contiguous instruction codes.

Still further, while, in the first or second embodiment, the branch history table 4 includes the pre-address latches 404 and the address subtracter 411 whereby during the writing of a branch destination address in the branch history table 4 both the high-order 29 bits of the branch instruction address and the value representing the former minus 1 are stored in the address tag section 401 thereby detecting the entry in which the high-order 29 bits of the branch instruction address hits either of these two values during the searching of the branch history table 4, it is possible to provide an address adder which adds 1 to the high-order 29 bits of the read address so that only the high-order 29 bits of the address are stored in the address tag section 401 thereby detecting that entry in which the value of the address tag section 401 hits the high-order 29 bits of the read address or the same value but increased by 1 during the search of the branch history table 4.

Still further, while, in the first or second embodiment, each of the read entry preference circuits 409 includes the subtracter 413, the decoder 415 and the logical circuits 415 and 416 as separate elements, all of them can be combined in one to perform the same functions for the purpose of simplifying the circuitry.

Still further, while, in the second embodiment, the instruction cache 3 includes the pre-address latches 324 and the address subtracter 335 whereby during writing of the instruction code in the instruction cache 3 both the high-order 29 bits of the address and the same value but decreased by 1 are stored in the address tag section 321 so as to search that entry in which the high-order 29 bits of the read address hits either of these values during reading of the instruction code from the instruction cache 3, it is possible to provide an address adder which adds 1 to the high-order 29 bits of the read address so that only the high-order 29 bits of the address are stored in the address tag section 321 thereby searching that entry in which the value of the address tag section 321 hits the high-order 29 bits of the read address or the same value but increased by 1 during reading of the instruction code from the instruction cache 3.

Still further, while, in the second embodiment, the instruction cache 3 includes the data drivers 331 to 333 which are controlled in response to the output lines of the first and second address tag comparators 329 and 330 and the value of the half-word identifying register 2 and the data drivers 334 which are operated only in response to the outputs of the first address tag comparators 329 whereby the desired 4 half words are selected from the 8 half words stored in the data latches 325 to 328 of the two entries selected by the first and second address tag comparators 329 and 330 and are outputted, the instruction cache 3 may be provided with only data drivers which are operated in response to the outputs of the first or second address tag comparators 329 or 330 whereby the 8 half words stored in the data latches 325 to 328 of the selected two entries or the 7 half words excluding the last half word are outputted and the desired 4 half words are selected from the 8 half words or the 7 half words in accordance with the value of the half-word identifying register 2 externally of the instruction cache 3.

Still further, while the instruction cache 3 is formed by the direct mapping method in the first embodiment and by the full associative method in the second embodiment, it may be formed by the set associative method.

From the foregoing description it will be seen that in accordance with the present invention an instruction code having a fixed length indicated by an instruction read address can be supplied irrespective of the position at which a displacement operand associate with an instruction is disposed.

In accordance with the third aspect of the invention, an instruction string of a predetermined word length can always be read out and it is possible to effect the prediction of a branch of the branch instruction which must be executed first irrespective of the position of the branch instruction in the instruction code read or irrespective of the number of the branch instructions included.

In accordance with the present invention the construction comprises regular repetitions and therefore even its incorporation in a semiconductor integrated circuit can be realized without any decrease in packing density and also the increase in the design period can be minimized.

It will thus be seen that the present invention has a very great practical effect.

We claim:
1. An instruction fetching device including a cache device, said cache device comprising:
   storage means for storing a plurality of pairs of data, each of said plurality of pairs of data including both an instruction string and an address at which said instruction string is located, said instruction string being divided into minimum lengths of instruction and including a given number of words, said storage means comprising parallel output means for outputting a plurality of said minimum lengths of instruction in parallel;
   searching means for selecting from said plurality of pairs of data stored in said storage means at least two pairs of data on the basis of an instruction fetching address designating an instruction to be fetched; and storage contents selecting means for selecting and causing said storage means to output every minimum length of instruction of one of the instruction strings included in said at least two pairs of data selected by said searching means by way of said parallel output means so that a plurality of minimum lengths of instruction of said one of the instruction strings are individually and simultaneously output in parallel even when at least one of the plurality of minimum lengths of instruction is contained in one of said at least two pairs of data in one register line and the rest of the plurality of minimum lengths of instruction are contained in another of said at least two pairs of data located in a different register line.

2. An instruction fetching device according to claim 1, wherein said at least two pairs includes a first pair of data including an address coincident with a part or whole of the instruction fetching address and at least one second pair of data including an address contiguous to the address included in said first pair.

3. An instruction fetching device according to claim 1, wherein said at least two pairs of data each including an address or a value obtained by subtracting a given number from an address coincident with a part or whole of said instruction fetching address.

4. An instruction fetching device including a branch history table, said branch history table comprising:
a plurality of pairs of storage means for storing a plurality of pairs of data, each pair including a branch destination address of a branch instruction and a set of an address of said branch instruction and a value obtained by subtracting a given value from said address of said branch instruction;
first searching means for selecting, from said stored plurality of pairs of data, a plurality of pairs of data, each selected pair of data including an address of a branch instruction coincident with a part or whole of an instruction reading address relating to an instruction to be executed;
first storage contents selecting means for selecting, from the plurality of pairs selected by said first searching means, a pair in which a difference obtained by subtracting the instruction reading address from the address of said coincident branch instruction is zero or a smallest positive value, and for causing said storage means to output the branch destination address included in said pair selected by said first storage contents selecting means;
second searching means for selecting, from said stored plurality of pairs of data, a plurality of pairs of data each of which include said value obtained by subtracting said given value from said address of said branch instruction coincident with a part or whole of the instruction reading address; and
second storage contents selecting means for selecting, when said first storage contents selecting means outputs nothing, from the plurality of pairs of data selected by said second searching means, a pair of data in which a difference obtained by subtracting the instruction reading address from said value obtained by subtracting said given value from the address of said coincident branch instruction is negative and has a smallest absolute value, and for causing said storage means to output the branch destination address included in said pair selected by said second storage contents selecting means.

5. An instruction fetching device comprising:
a first storage means for storing a first plurality of pairs of data, each of said first plurality of pairs of data including an instruction string and an address of said instruction string, said instruction string being divided into minimum lengths of instruction and including a given number of words, said first storage means comprising parallel output means for outputting a plurality of said minimum lengths of instruction in parallel;
cache searching means for selecting from said first plurality of pairs of data stored in said first storage means at least two pairs of data on the basis of an instruction fetching address that designates an instruction to be fetched;
cache storage contents selecting means for selecting and causing said first storage means to output one instruction string, by outputting every one of its minimum lengths of instruction, from the instruction strings included in said at least two pairs selected by said cache searching means by way of said parallel output means so that a plurality of minimum lengths of instruction of said one of the instruction strings are individually and simultaneously output in parallel even when at least one of the plurality of minimum lengths of instruction is contained in one of said at least two pairs of data in one register line and the rest of the plurality of minimum lengths of instruction are contained in another of said at least two pairs of data located in a different register line;
a second storage means for storing a second plurality of pairs of data, each pair including a branch destination address of a branch instruction and a set of an address of said branch instruction and a value obtained by subtracting a given value from said address of said branch instruction;
first branch searching means for selecting every one of said second plurality of pairs of data stored in said second storage means which includes an address of a branch instruction that matches a part or the whole of an instruction fetching address that designates an instruction to be fetched;
first branch storage contents selecting means for selecting, from the pairs selected by said first branch searching means, a pair in which a difference obtained by subtracting the instruction fetching address from the address of said branch instruction that matches a part or the whole of the instruction fetching address is zero or a smallest positive value, and for causing said second storage means to output the branch destination address included in said pair selected by said first branch storage contents selecting means;
second branch searching means for selecting every one of said stored second plurality of pairs of data in which said value obtained by subtracting said given value from the address of said branch instruction matches a part or the whole of the instruction fetching address; and
second branch storage contents selecting means, operative when said first branch storage contents selecting means selects nothing, for (i) selecting, from the pairs selected by said second branch searching means, a pair in which a difference obtained by subtracting the instruction fetching address from said value obtained by subtracting said given value from the address of said branch instruction that matches a part or the whole of the instruction fetching address is negative and has a smallest absolute value, and for (ii) causing said second storage means to output the branch destination address included in said pair selected by said second branch storage contents selecting means.

6. An instruction fetching device according to claim 5, wherein said at least two pairs includes a first pair in which an address included therein is coincident with a part or whole of said instruction reading address and at least a second pair in which an address included therein is contiguous to the address included in said first pair.

7. An instruction fetching device according to claim 5, wherein each of said first plurality of pairs of data comprises a set comprising said address specifying said instruction string and a value obtained by subtracting a given value from said address specifying said instruction string, and said at least two pairs selected by said cache searching means includes an address or a value obtained by subtracting said given value from said address of said branch instruction that is coincident with a part or whole of said instruction read address.

* * * * *